(12) United States Patent
Bosch et al.

(10) Patent No.: US 8,682,503 B2
(45) Date of Patent: Mar. 25, 2014

(54) MOBILE INTERFACE AND SYSTEM FOR CONTROLLING VEHICLE FUNCTIONS

(75) Inventors: Ralf Bosch, Rottweil (DE); Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 506 days.

(21) Appl. No.: 12/958,717

(22) Filed: Dec. 2, 2010

(65) Prior Publication Data

US 2011/0137490 A1  Jun. 9, 2011

(30) Foreign Application Priority Data

Dec. 3, 2009 (DE) .......................... 10 2009 056 786

(51) Int. Cl.
*G06F 19/00* (2011.01)
(52) U.S. Cl.
USPC ............... 701/2; 701/36; 701/31.4; 701/32.6; 713/150; 713/166; 713/162
(58) Field of Classification Search
USPC ........ 701/2, 36–49, 31.4, 32.6; 713/150, 166, 713/162
See application file for complete search history.

(56) References Cited

U.S. PATENT DOCUMENTS

| | | | |
|---|---|---|---|
| 5,917,405 A | 6/1999 | Joao | |
| 6,169,943 B1* | 1/2001 | Simon et al. | 701/31.5 |
| 6,282,491 B1 | 8/2001 | Bochmann et al. | |
| 6,472,771 B1* | 10/2002 | Frese et al. | 307/10.1 |
| 6,771,749 B1* | 8/2004 | Bansal et al. | 379/88.17 |
| 8,369,967 B2 | 2/2013 | Hoffberg et al. | |
| 8,392,552 B2 | 3/2013 | Alexander et al. | |
| 2001/0033225 A1* | 10/2001 | Razavi et al. | 340/425.5 |
| 2004/0006691 A1* | 1/2004 | Bergmann et al. | 713/150 |
| 2005/0005298 A1* | 1/2005 | Tranchina | 725/81 |
| 2005/0197747 A1* | 9/2005 | Rappaport et al. | 701/1 |
| 2007/0038434 A1 | 2/2007 | Cvetko | |
| 2007/0143798 A1* | 6/2007 | Jira et al. | 725/62 |
| 2008/0027643 A1* | 1/2008 | Basir et al. | 701/213 |
| 2008/0103651 A1* | 5/2008 | Pillar et al. | 701/29 |
| 2008/0168205 A1 | 7/2008 | McCoy et al. | |
| 2008/0192659 A1* | 8/2008 | Santavicca | 370/280 |
| 2008/0221742 A1* | 9/2008 | DiCroce | 701/2 |
| 2008/0244050 A1* | 10/2008 | Wong et al. | 709/223 |
| 2009/0058595 A1* | 3/2009 | Mainguet et al. | 340/5.53 |
| 2009/0096870 A1* | 4/2009 | Zheng | 348/148 |
| 2009/0160607 A1* | 6/2009 | Edwards et al. | 340/5.61 |
| 2009/0285000 A1 | 11/2009 | McCoy | |

(Continued)

FOREIGN PATENT DOCUMENTS

DE  196 40 735  4/1998
DE  10 2007 038 690 A1  2/2009

(Continued)

OTHER PUBLICATIONS

Wolf et al., State of the art: embedding security in vehicles, 2007, EURASIP Journal on Embedded Systems.*

(Continued)

*Primary Examiner* — Thomas Black
*Assistant Examiner* — Sara Nelson
(74) *Attorney, Agent, or Firm* — Cozen O'Connor

(57) ABSTRACT

A mobile interface for controlling a plurality of vehicle functions in a motor vehicle using a controller connected to the vehicle, having a wireless data interchange with a controller, an input apparatus, and an energy store. By virtue of the wireless data interchange being connected to a data processing unit integrated in the mobile interface and which is designed to apply at least one cryptological method, a greater scope of functions becomes possible that can also include control of safety-relevant vehicle functions.

18 Claims, 3 Drawing Sheets

(56) References Cited

U.S. PATENT DOCUMENTS

2010/0057624 A1* 3/2010 Hurt et al. .................. 705/76
2012/0089299 A1* 4/2012 Breed .......................... 701/36

FOREIGN PATENT DOCUMENTS

| EP | 1 150 098 | 10/2001 |
| JP | 2003-130669 | 5/2003 |
| WO | WO 2009073806 A2 * | 6/2009 |

OTHER PUBLICATIONS

Wolf et al., "State of the Art: Embedding Security in Vehicles", 2007, EURASIP Journal of Embedded Systems.

Silex technology; "wiDock wireless dock for iPod"; Jan. 1, 2006 (online); pp. 1-2; XP007918004; found to Internet: http://www.silexamerica.com/products/data_sheets/widock_datasheet.pdf; found: Mar. 29, 2011.

* cited by examiner

MOBILE INTERFACE AND SYSTEM FOR CONTROLLING VEHICLE FUNCTIONS

BACKGROUND OF THE INVENTION

1. Field of the Invention

The invention relates to a mobile interface for controlling a plurality of vehicle functions using a controller connected to the vehicle, having an input apparatus, a wireless data interchange, and an energy store, and a system for the mobile actuation of vehicle functions having a controller and a mobile interface.

2. Description of the Related Art

Mobile interfaces for controlling vehicle functions are already known based on the prior art. However, these have a relatively small scope of functions and are usually limited to convenience functions of the vehicle.

Such limitation is unfavorable, since, by way of example, there is also the need for remote control of further functions, such as the retrieval of safety-relevant vehicle functions.

What is particularly unfavorable is limitation to convenience functions in the commercial vehicle market, since mobile interfaces based on the prior art cannot be used to control commercial vehicle functions.

Although remote controls are also known for some commercial vehicle functions, these are individual solutions which are suitable for controlling precisely one particular function.

SUMMARY OF THE INVENTION

An object of the invention is therefore to allow a mobile interface and a system for the mobile actuation of vehicle functions which has an enhanced scope of functions.

A wireless data interchange is connected to a data processing unit integrated in a mobile interface and is designed to apply at least one cryptological method that allows significantly more vehicle functions to be controlled remotely, since it is also possible to control functions which, on the basis of the prior art, can be controlled only by wired actuation or by a separate remote control, for security reasons.

Examples of controllable functions are operation of: a vehicle locking system, a crane mounted on the vehicle, a raisable loading tailgate in HGVs, a tail lift, a navigation system, infotainment systems, and/or convenience functions. It should be pointed out that a plurality of functions means that functions of a plurality of different appliances in a vehicle can be actuated.

By way of example, the wireless data interchange may be in the form of a WLAN, ZigBee, and/or BlueTooth interface and may advantageously have a range of between 5 m and 1 km, particularly advantageously between 10 m and 300 m. Wireless data interchange with a controller integrated in the vehicle is thus also possible from outside the vehicle. Advantageously, a range may be dependent on a vehicle function to be activated, particularly such that a transmission power for the wireless data interchange is reduced in the case of some, advantageously particularly safety-relevant, vehicle functions.

Cryptological methods can preferably be regarded as security-related methods that fulfill the properties of integrity, authenticity, and/or confidentiality.

Advantageously, the interface has a display apparatus. This not only allows processes to be controlled but also allows information from the vehicle to be retrieved and displayed. By way of example, information relating to the monitoring of the execution of a vehicle function can be retrieved.

In one advantageous embodiment, the interface contains at least one data memory. Such a memory may be a nonvolatile mass storage unit, in particular. The memory may advantageously be in the form of a flash memory. With particular advantage, the data memory is in the form of a secure data memory. To this end, the data memory may be designed for encrypted storage of data.

Advantageously, the interface is designed to store user profiles in the data memory. The user profiles may contain settings for altering menu guidance for the control of vehicle functions. By way of example, some keys can be individually assigned important functions by the user. This provides the interface with improved alignment to suit a requirement profile prescribed by the user. Furthermore, the interface may also be designed to use the user profile to additionally store information about the user which does not relate directly to the operation of the interface. By way of example, settings for voice control may also be stored in the user profile.

Advantageously, it is also possible to store a plurality of different user profiles in the data memory. A user profile to be used is then advantageously requested when the interface is started, and can also be changed over during operation.

The data memory can advantageously also be used to store updated programs and/or drivers for appliances which are integrated in a vehicle or that are connected to a vehicle. The interface may advantageously be designed to transmit the drivers and/or updated programs to a controller for forwarding to a target appliance. In addition, the data memory can be used to store recorded tachograph data.

In a further advantageous embodiment, the data processing unit is designed such that it allows not only control of vehicle functions but also control of functions of further apparatuses connected to the vehicle. To this end, the data processing unit is designed to transmit control commands for further apparatuses connected to the vehicle to a controller using the wireless data interchange, said controller then being able to forward the control commands.

Requisite control information can advantageously be stored in the interface subsequently, so that a scope of functions of the interface can be aligned at any time with an altered scope of functions, for example one altered as a result of upgrade of the vehicle or connection of additional appliances. Advantageously, however, the interface may already contain the necessary control commands for a multiplicity of upgradable components for the vehicle, which means that subsequent upgrade is necessary only in special cases.

In one particularly advantageous embodiment, the interface is designed to control a vehicle locking installation, but the data processing unit is advantageously designed such that cryptological methods can be used not only for controlling a vehicle locking installation but also for controlling further vehicle functions.

Advantageously, the data processing unit is designed to use a plurality of different cryptological methods. By way of example, it is possible for it to be designed to use symmetric and/or asymmetric encryption methods. In one advantageous embodiment, the data processing unit may be designed for encryption by DES and/or RSA. It is particularly advantageous if this is such that, whenever the interface is switched on, a session key encrypted by an asymmetric method such as RSA is transmitted which is subsequently used for symmetric encryption, for example by DES. An example of a method in which a message is transmitted symmetrically in encrypted form while the key is transmitted asymmetrically in encrypted form with the message is the PGP (Pretty Good Privacy) method.

Apart from a design of the data processing unit for the use of encryption methods, a design for other cryptological methods is also conceivable. By way of example, the data processing unit may be designed to create and check digital signatures, to use hash functions and/or to use different authentication methods, such as challenge-response authentication.

Advantageously, the data processing unit may be designed to use a two-factor or three-factor authentication method. This can be understood to mean that authentication requires not only a piece of information, such as a key for an encryption method, but at the same time also the presence of a particular object and/or evidence of a particular biometric feature.

To this end, the interface advantageously contains an additional security apparatus. This may be in the form of a smart card controller, wherein the transmission of correctly signed control commands, particularly for safety-relevant control commands, preferably requires the insertion of a prescribed smart card into the controller. In order to achieve a particularly high level of security, use may be made of the principle of secret sharing in this context. The interface may be designed to store only a portion of a code which is required for signing and/or encryption, with a second portion of the code being read in by the smart card controller. Another example of additional security devices are iris or fingerprint recognition units.

Another possible additional security apparatus is a housing protection unit. This may be designed to recognize when the housing of the interface is opened and to initiate security measures which are then necessary. One such security measure may be the erasure of safety-relevant data or disablement of the interface.

Advantageously, a vehicle locking installation can be controlled using a different cryptological method than for other control commands. It should be mentioned that the interface does not necessarily need to be designed to transmit all control commands for vehicle functions in encrypted form using a cryptological method. On the contrary, it may be advantageous if only safety-relevant control commands are transmitted in encrypted form.

In one advantageous embodiment, the data processing unit is designed to actuate and activate functions of the onboard computer. This allows systems used in a vehicle to be checked and any existing vehicle problems to be diagnosed. This can be done by retrieving measured values from sensors installed in the vehicle. In addition, various user settings, for example settings for convenience functions in the vehicle, can be altered. Alternatively or in addition, the data processing unit may be designed to undertake functions of the onboard computer completely. This allows the functions to be accessed without the onboard computer itself being active.

In one particularly advantageous embodiment, the interface is at the same time in the form of a mobile telephone and/or PDA. This results in considerable savings in comparison with use of separate appliances, since many components are therefore able to perform a dual function. By way of example, a display apparatus, which may be in the form of a touch screen, for example, can be used both for displaying an SMS, MMS and incoming calls and for displaying activatable vehicle functions. An antenna for connection to a mobile radio network can integrate the wireless data interchange with a controller. Overall, this results in both a cost advantage and a convenience advantage, since it is therefore not necessary to carry an additional appliance.

Alternatively, the interface may also only be of similar design to a mobile telephone or PDA. By way of example, the interface may have a connection for a charger, the design with a touchpad and/or the design for use as an operating system, as known for mobile telephones and/or PDAs based on the prior art.

In a further advantageous embodiment, the data processing unit is connected to at least one interface unit, integrated in the interface, for reading and/or writing to cards and/or mobile storage media. Such an interface unit may be used to provide the interface with data required for controlling apparatuses which are newly connected to the vehicle.

A further interface unit may be designed to read a driver card. Such driver cards are usually used for tachographs. Since, on the basis of the design of the data processing unit for the use of cryptological methods, transmission is sufficiently reliable, it is no longer necessary for the driver card to be inserted into a tachograph. This simplifies the use of the tachograph, since it is advantageously possible to dispense completely with manual access thereto, because both the control of the tachograph and the access to the driver card can be effected via the mobile interface.

This also allows more advantageous arrangement of instruments in the cockpit of commercial vehicles, since the tachograph no longer imperatively needs to be installed at an easily accessible point. This frees up space for instruments needed for the journey.

In addition, such a user profile of the interface can automatically be selected using an inserted driver card.

In addition, the interface may have a USB interface unit. This can be used to connect the interface to a computer or notebook, for example, for the purpose of transmitting data.

Furthermore, the interface may have a holder for a SIM card. Such a holder is necessary particularly when the interface is in the form of a mobile telephone.

A further increase in convenience is possible by virtue of the mobile interface being designed for keyless identification. Such a design as a secure "identification tool" allows access to a multiplicity of functions which would otherwise require identification by a key. By way of example, it is possible to activate or deactivate various vehicle units. In addition, an access check for protected areas of the vehicle can be effected by the interface.

In one particularly advantageous embodiment, the interface is in a form such that even identification setting up a connection to the bank is possible by the interface. To this end, the interface advantageously contains an interface unit in the form of a bank card reader. Payment operations, for example at filling stations, are thus significantly simplified. This reduces the time required for filling operations, which results in considerable savings when calculated over the total life of an interface according to the invention.

Preferably, the wireless data interchange may be designed for automatic deactivation at the start of a journey. This reliably prevents any disruptions in a vehicle by the wireless data interchange.

The interface advantageously contains a cable-based interface unit. The mobile interface can also be connected to the controller by a direct connection. In this case, "cable-based" is not necessarily intended to be understood to mean an opening for inserting a cable connector. On the contrary, in one particularly advantageous embodiment, contacts are provided for inserting the mobile interface into a docking station. This allows use of the interface while the wireless data interchange is deactivated. Furthermore, connectivity to a docking station allows the interface to be in the form of an ignition key at the same time, since for safety reasons it would usually not be desirable to allow wireless activation of the ignition apparatus, despite encrypted transmission.

In addition, the invention also relates to a system for the mobile actuation of vehicle functions. Such a system contains at least an interface and a controller which is connected or can be connected to the vehicle. The controller and the interface are designed for data interchange with one another, both the controller and the interface being designed to use cryptological methods for the data interchange. The controller is designed to output control signals and/or other data to a target appliance on the basis of operation of the input apparatus of the interface.

In one simple embodiment, the dependency may be such that the interface transmits only information about the operation of the input apparatus to the controller in encrypted form, with the controller generating control signals on the basis thereof. In the simplest case, the interface is merely in the form of a wireless input appliance designed for encrypted transmission.

Preferably, however, the interface is designed to produce and transmit control signals which are forwarded from the controller advantageously to a target appliance, the target appliance being stipulated by the interface using the transmitted data and/or control signals.

In this context, a target appliance is understood to mean the appliance from which a function is intended to be retrieved by the transmitted data. If the data contains information that the heating temperature of the seat heating is intended to be increased the target appliance would be the appliance that regulates the seat heating temperature.

In addition, it should be mentioned that, in line with one embodiment of the invention, the data and/or control signals do not necessarily have to be output directly to the target appliance. It is equally possible for control commands transmitted by the interface and received by the controller to be forwarded to the target appliance via one or more interposed appliances.

Advantageously, the controller may also have additional security apparatuses, as described previously for the interface.

In one advantageous embodiment, the controller contains an instrument, particularly a tachograph, or is in the form of such. Particularly a tachograph design may be advantageous, since tachographs have a high level of security due to legal requirements. By way of example, tachographs usually have a housing protection unit, which records unauthorized opening of the housing, and a secure data memory.

As a result, the complexity for producing a modified tachograph in the form of a controller is significantly lower than for producing a tachograph and a separate controller.

The tachograph or the instrument may advantageously be part of a combination appliance, with the interface and the controller advantageously being designed such that it is possible to retrieve not only functions of appliances that are part of the same combination appliance but also functions of further appliances that are not part of the same combination appliance.

In one particularly advantageous embodiment, the controller is formed by a tachograph and a module that can be detachably connected to a tachograph for wireless data interchange with the interface. The interchangeable data may also comprise data for controlling the tachograph. This allows the tachograph to be operated independently of the installation location. In addition, the interface may have a significantly higher number of control options, which are provided by keys integrated in the interface, than the tachograph. This allows functions of the tachograph to be called much more quickly, since operation of a single key on the interface can correspond to operation of a plurality of keys on the tachograph. In addition, a user interface and user guidance can advantageously be reconfigured by the user himself.

Advantageously, the interface can check working hours and distances travelled. In addition, printouts containing information ascertained by the tachograph can be requested from a printer which is advantageously integrated into the tachograph. At the same time, it is possible to use a printer integrated in the tachograph to print any other vehicle information and/or further information which has been input by the interface. Advantageously, it is also possible to retrieve any further functions of the tachograph via the interface.

In one advantageous embodiment, the detachable connection between the module and the tachograph is in the form of a K line.

Generally, a module for wireless data interchange with the interface, which module can be detachably connected to an appliance installed in the vehicle, can form the controller together with the appliance itself which is installed in the vehicle. This produces the advantage that an appliance which is already installed in the vehicle can be upgraded in order to form a controller for a system according to the invention.

In one particularly preferred embodiment, the system contains a docking station for the interface. The docking station may be designed to charge the energy store of the interface. In addition, the docking station may be designed such that where the interface is connected to the docking station the wireless data interchange in the interface and in the controller are deactivated, with the docking station undertaking the task of connecting interface and controller for the purpose of data interchange.

The interface can advantageously be connected to the docking station by a cable and/or by a plug connection. It is also possible for them to be connected by placing the interface into the docking station, as is known from cordless landline telephones, for example.

With particular preference, the docking station is integrated in the controller. This avoids a need for an additional appliance.

Advantageously, the controller and the interface are designed such that when the interface is connected to the docking station there is automatic reading of information from the user profile. This information can then output control signals for altering configurations of devices in the vehicle. In this context, control of any user-configurable appliances in the vehicle is conceivable. By way of example, it is possible to alter settings for the driver seat, for the vehicle mirrors, for the voice control, for the infotainment systems, for the air conditioning installation and for further convenience and commercial vehicle functions.

For this, it is not absolutely necessary for the user profile, as described above, to be stored on a data memory integrated in the interface. It is equally possible for one or more user profiles to be stored in the controller too, with the current user and hence the user profile to be used being able to be determined automatically using an interface which is connected to the docking station.

In one particularly advantageous embodiment, the system contains a plurality of interfaces, each of the interfaces being able to be designed to store at least one user profile. Hence, user guidance and the keys to be used for retrieving a particular function may be dependent on the interface used.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in more detail below with reference to FIGS. 1 to 6, in which.

DETAILED DESCRIPTION OF THE PRESENTLY PREFERRED EMBODIMENTS

Figure 1:
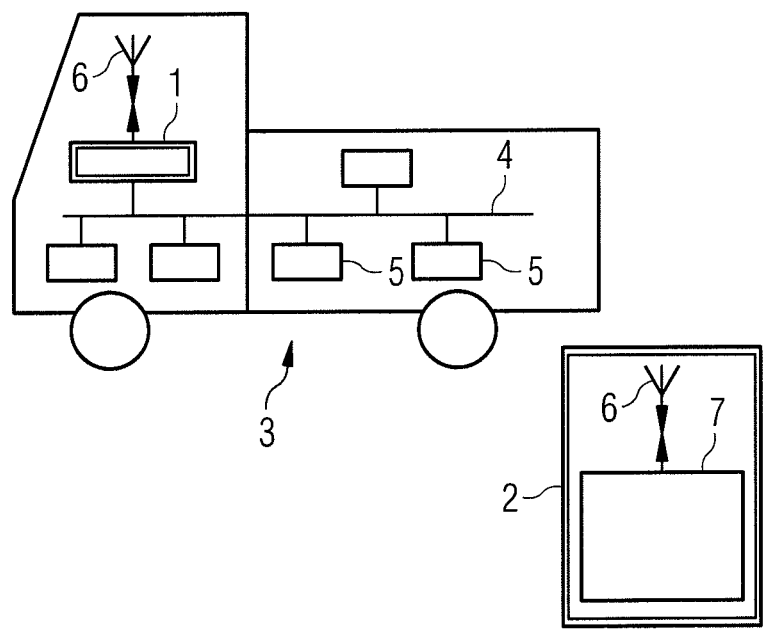
FIG. 1 is a schematic diagram of a system according to one embodiment of the invention in the state in which it is installed in a vehicle.

FIG. 1 is a first embodiment of a system according to one embodiment of the invention for the mobile actuation of vehicle functions. The system comprises a secure controller 1 and an interface 2. The controller 1 is integrated in the vehicle 3 and is connected to a plurality of further controllers 5 by a bus system 4 which is integrated in the vehicle, wherein the further controllers 5 usually do not have security functions such as supporting encrypted data transmission. Both the controller 1 and the interface 2 respectively have a respective integrated data processing unit 1', 2' designed for the cryptological encryption and decryption of data, for example by an RSA or DES method, and integrated wireless data interchange. In the present exemplary embodiment, the wireless data interchange is in the form of a WLAN antenna 6 having a range of 300 m, so that vehicle functions can be activated by the interface 2 even outside the vehicle. It would likewise be possible for the wireless data interchange to be in the form of a ZigBee or BlueTooth interface unit. Furthermore, the interface 2 contains an input apparatus and a display apparatus, which in the present exemplary embodiment are combined in the form of a touchscreen 7.

The touchscreen 7 allows the display of information, relating to the vehicle state, which can be retrieved by the interface 2 via the controller 1.

In one simplified embodiment, the interface 2 may be in a form without a display apparatus. In such embodiments, display is effected by a display apparatus which is advantageously integrated in the controller 1.

The interface 2 is designed to take inputs by a user via the touchscreen 7 as a basis for transmitting to the controller 1 control commands that have been encrypted by a cryptological method and/or provided with a signature or which are unencrypted. The commands are forwarded from the controller 1 to the various further controllers 5, the forwarding usually being effected in unencrypted and unsigned form.

If a user gives the instruction to switch off an antilock braking system (ABS) which is present in the vehicle, for example, then the appropriate safety-relevant control command is transmitted in encrypted form, and/or with a digital signature which ensures that the interface and/or a user is/are authentic, to the further control unit 5 which is designed to control the ABS. This prevents unauthorized parties from using a similar interface, for example from an identical range, to change said safety-relevant function without authorization.

If, on the other hand, a user gives the command to switch on an air conditioning installation in the vehicle in order to produce a pleasant interior temperature before entering the vehicle, the output via the antenna 6 is advantageously effected in unencrypted form.

The interface 2 is additionally designed for keyless operation of the vehicle locking system, for which purpose it advantageously contains an RFID chip—not shown. Said RFID chip is likewise designed to perform an encryption method, which may be another method, not used by the data processing unit.

Alternatively, it is also possible for the vehicle locking installation to be operated by the interface 2 via the controller 1 without there being a separate RFID chip for this. It is particularly advantageous that the data processing unit is designed to output control commands for operating the vehicle locking system from the interface 2 to the controller 1 at reduced transmission power via the means for wireless data interchange, since this reduces the range from which the vehicle locking system can be activated. This makes it more difficult to detect the vehicle using a stolen interface 2.

The controller 1 is designed to manage the incoming control commands and to forward them to the further controllers 5 via the bus system 4. The controller 1 therefore performs a server function. In addition, the interface 2 may be designed to output control commands for apparatuses connected to an interface unit of the vehicle and which are not part of the vehicle, the controller 1 being designed to forward the control commands to the aforementioned interface unit.

In alternative embodiments, tasks distribution between interface 2 and controller 1 may be shifted such that the interface does not transmit complete control commands to the controller 1 but rather merely transmits information about instances of operation of the input apparatus in the form of a touchscreen 7. In such embodiments, the actual control commands are produced via the controller 1.

In the present exemplary embodiment, transmission is possible in both directions, that is to say from the interface 2 to the control unit 1 and vice versa. The wireless data interchange are both in the form of a transmitter and in the form of a receiver. This allows the interface to be used to retrieve information about the vehicle.

Figure 2:
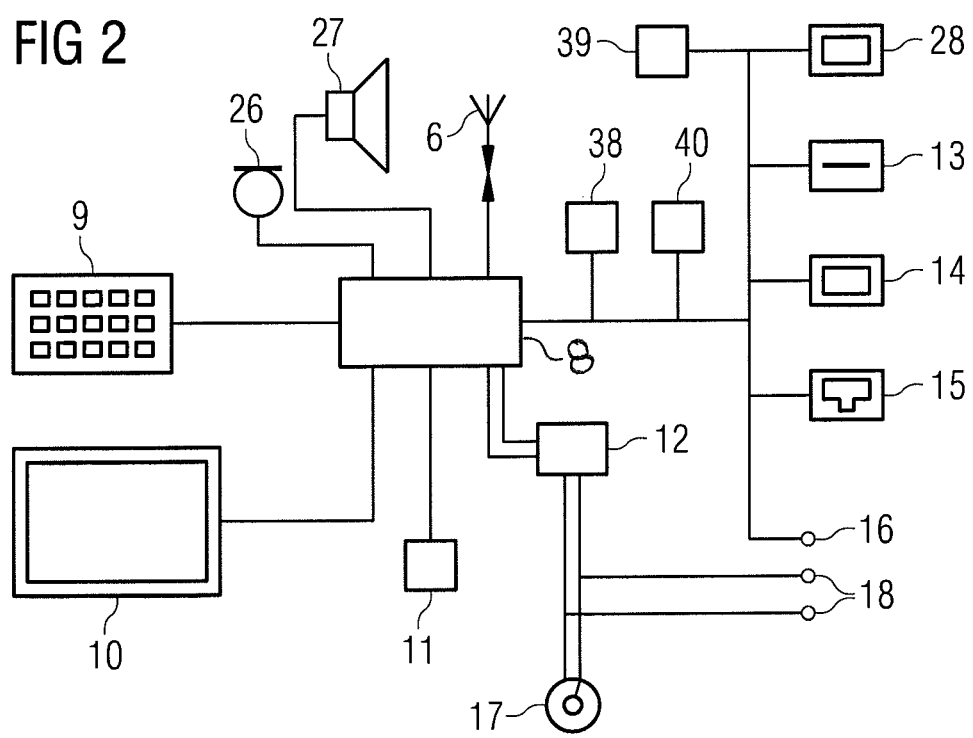
FIG. 2 is the interface according to a second embodiment of the invention.

FIG. 2 schematically shows the design of an interface in accordance with a second embodiment of the invention. The interface contains a data processing unit 8. The latter has an input apparatus 9, a display 10, a wireless data interchange in the form of an antenna 6, a data memory 11, an energy store 12, a microphone 26, a loudspeaker 27 and an interface unit 28 for reading a SIM card connected to it. In addition, the data processing unit 8 may be connected to a chip card reader 13, a USB port 14, a connection 15 for an RJ-45 plug connection, a fingerprint detector 38, a smart card controller 39, a housing intrusion sensor 40, and contacts 16 for data connection to a docking station.

The energy store 12 is connected to a connection 17 for a charging cable, and also to contacts 18 for charging via a docking station.

In this exemplary embodiment, the data processing unit 8 is designed to have a high computation capacity. This allows the data processing unit 8 to have some of the range of functions or else the complete range of functions of the onboard computer in the vehicle. These include the retrieval of measured values from sensors integrated in the vehicle and the configuration of various convenience functions, for example.

In addition, the data processing unit 8 is designed to perform data and signal processing steps necessary for mobile telephony. In addition, the antenna 6 is designed for connection to a mobile radio network. The interface 2 advantageously has the complete range of functions of mobile telephones known based on the prior art so that the interface completely replaces a conventional mobile telephone.

Furthermore, the data processing unit 8 is designed to transmit control commands with a digital signature to the controller, wherein control commands for safety-relevant vehicle functions are accepted by the controller 1 preferably only in correctly signed form. The digital signature can advantageously be produced in full only if a fingerprint of a person authorized to use the interface 2 has been identified by the fingerprint detector 38. In particular, the signature may contain data about the detected fingerprint. This means that the signature may require data not stored on the interface itself, so that a stolen interface cannot be used to control the safety-relevant vehicle functions.

Alternatively or in addition, the production of a signature may require data stored on a smart card which are able to be read in by the smart card controller 39.

Some of the data required for producing a signature can also be stored on the interface. The data can advantageously be automatically erased if the housing intrusion sensor 40 detects inadmissible opening of a housing of the interface 2. This also prevents the interface from being manipulated.

In the present exemplary embodiment, the data memory 11 is in the form of a flash memory and particularly in the form of a secure data memory, with the data processing unit 8 being designed for encrypted storage on the data memory 11.

The data memory advantageously has an operating system stored on it that can be used for the data processing unit. Menu guidance for the activation of vehicle functions, and also further properties of the user interface, can be configured by the user as desired and stored in a user profile which is stored on the data memory 11.

In addition, a user can store presets for vehicle functions in the user profile. These presets for vehicle functions can then advantageously be transmitted to the controller 1 when the user so desires, said controller then forwarding appropriate control commands to the further controllers 4.

By way of example, the driver's seat and the settings for the vehicle mirrors can be automatically adjusted to suit the driver. In addition, speaker data for voice control can be automatically loaded from the user profile and transmitted to a voice controller which is present in the vehicle. Preselection of stored radio stations can also be loaded from the user profile.

Such automatic configuration of the vehicle affords advantages particularly when a driver of a vehicle frequently changes, as is the case in companies which have a large number of vehicles of the same type, where utilization level, for example, is grounds for not being able to ensure that the same driver always uses the same vehicle. In such fields of use, automatic configuration of the vehicle saves the work time which is otherwise required for manual configuration, which is why use of a system designed as described above affords significant economic advantages.

It goes without saying that it is also possible for a plurality of user profiles to be stored on the data memory 11. A user profile can then be chosen when switching on the interface, and can subsequently be changed during operation when the user so desires.

In addition to the operating system and the user profiles, it is also possible for further data, for example tachograph data, further vehicle-related data, data for controlling further vehicle functions and/or drivers and improved programs for the controller 1 or for further controllers 5, to be stored on the data memory 11.

Advantageously, it is also possible to access the data memory 11 via the USB interface unit 14, the RJ45 interface unit 15, or the chip card reader 13. This allows improved and/or extended control commands, for example, to be installed on the interface, which subsequently has a further-enhanced scope of functions.

Figure 3:
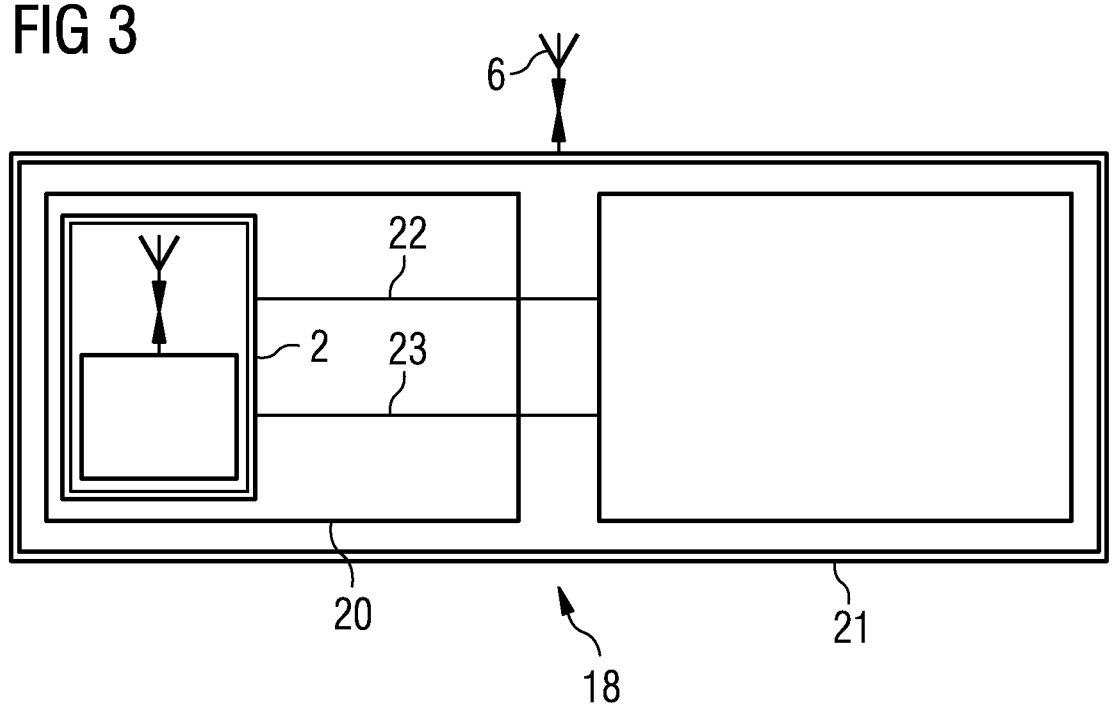
FIG. 3 is a system according to the invention with a docking station integrated in a controller.
Figure 4:
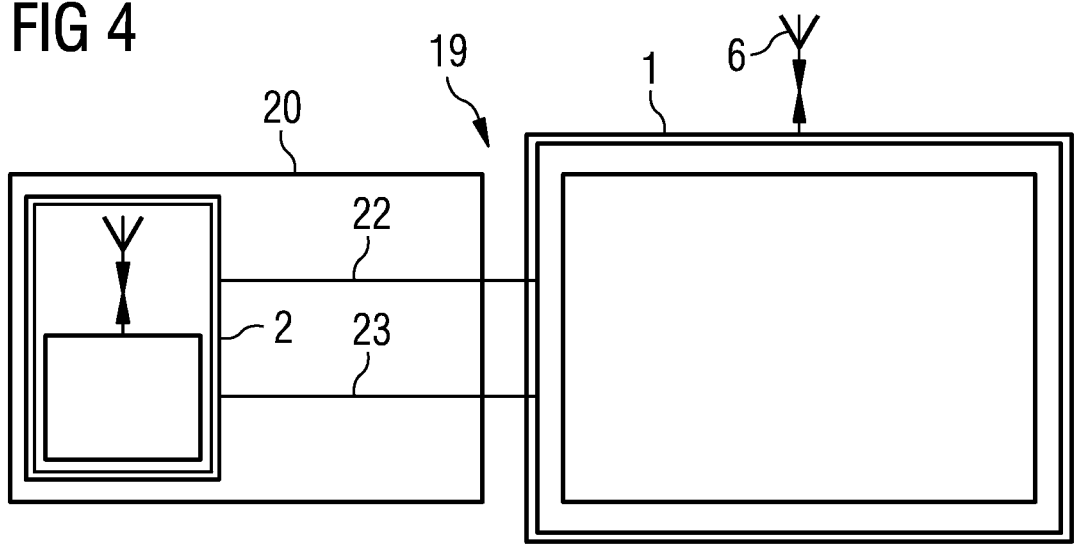
FIG. 4 is a system according to the invention with a separate docking station.

In the embodiments shown in FIGS. 3 and 4, systems 18, 19 for the mobile actuation of vehicle functions are shown. Both systems respectively contain a docking station 20. The two systems shown differ in that in the embodiment shown in FIG. 3 a docking station 20 integrated in the controller 21 is used, whereas in FIG. 4 a separate docking station 21, but one which is connected to the controller 1 via a power connection 22 and a data link 23, is shown.

In both embodiments, the wireless data interchange which is in the form of an antenna 6 is automatically deactivated at least to some extent when the interface 2 is inserted into the docking station 21, with the function of said means, namely the setup of a connection for transmitting data between interface 2 and controller 1, 21, being undertaken by the data link 23. A portion of the wireless data interchange used for connection to a mobile radio network can remain activated. If a mobile radio antenna fitted to the outside of the vehicle is connected to the controller 1, 21, it is also possible for this portion of the wireless data interchange to be deactivated.

Furthermore, when the interface 2 is inserted into the docking station 20, the settings stored in the user profile are automatically transmitted to the controller 21, 1, which allows the vehicle to be preconfigured as described above.

In addition, the interface 2, which—as described above—is advantageously in the form of a mobile telephone, can use the docking station 20 to establish a connection to a hands-free device present in the vehicle, so that a separate docking station for a mobile telephone becomes unnecessary.

Furthermore, the interface can also replace an ignition key and the docking station can replace an ignition lock, such that it is possible for starting of the vehicle to be activated by the interface as soon as the interface is connected to the docking station.

Figure 5:
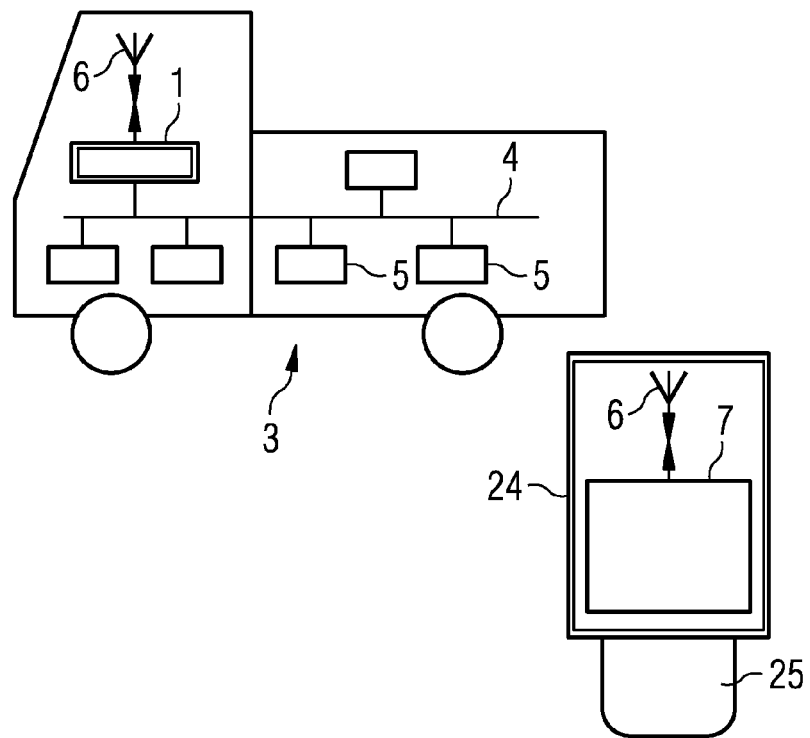
FIG. 5 is a schematic diagram of a fifth embodiment of the invention.

FIG. 5 shows an embodiment of the invention in which the interface 24 contains an additional interface unit. In the present exemplary embodiment, the additional interface unit is in the form of an ISO7816 interface unit 25 for reading and/or writing to chip cards. In particular, the interface unit 25 can read driver cards, inspection cards, bank cards and/or vehicle fleet cards. Depending on the card inserted, various additional functions can be enabled. If a driver card is inserted into the interface unit 25, it is possible, by way of example, to access the same driver-related data as would otherwise be retrievable via a tachograph with the driver card inserted. If a bank card is inserted, payment operations can be performed via the interface. When the interface is in the form of a mobile telephone with internet access or when used in combination with a vehicle which contains a wireless internet connection, mobile online banking is also possible.

In a further embodiment, particular further controllers 5 can be actuated and/or configured as a result of particular chip cards being inserted into the interface unit 25. By way of example, access to a controller for a crane structure which is part of the vehicle and/or for cooling units and/or audio installations may be possible only when a chip card provided specifically for the purpose has been inserted into the interface unit 25.

Similarly, it may be advantageous for a particular chip card to be inserted for the purpose of enabling any control facilities of the interface 24. These control facilities may also include the operation of a locking installation for the vehicle. This is advantageous particularly because it reduces the risk of vehicle theft or unauthorized access to the vehicle in the event of the interface being lost or stolen, since the vehicle can be opened only with the interface in combination with the chip card.

Alternatively, insertion of a particular chip card may be necessary for the purpose of updating the software of further controllers 5.

If the inserted chip card is specific to a person, the insertion of this chip card implies that the interface is being used by a particular person. It is therefore then possible for a user profile associated with said person to be loaded automatically. An example of a chip card of such a person-specific nature is a driver card.

Figure 6:
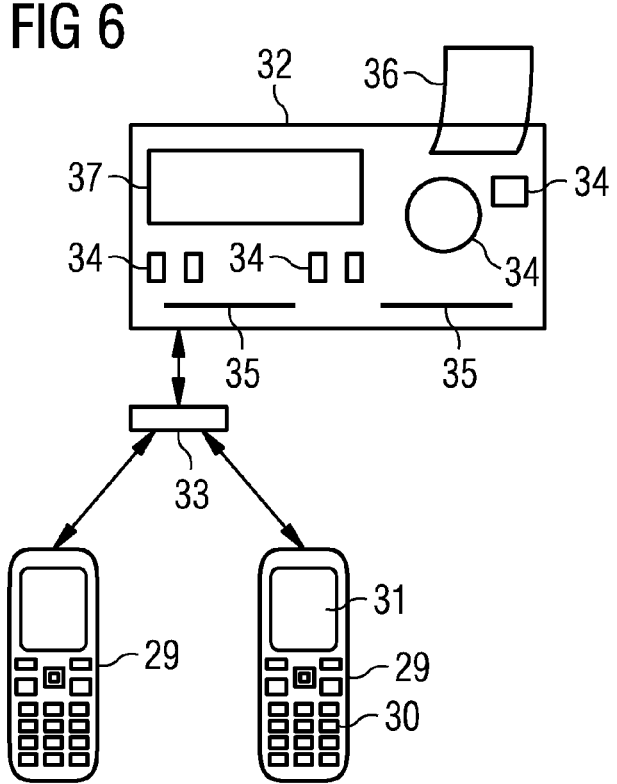
FIG. 6 is a schematic of a sixth embodiment of the invention.

FIG. 6 shows a further embodiment of a system according to the invention. This comprises two interfaces 29 which each contain an input panel 30 and a display 31 and may otherwise each be designed like the interface from the first exemplary embodiment, and also comprises a controller comprising a tachograph 32 and a reception module 33 connected to the tachograph 32 via a K line. In this embodiment, the tachographs 32 may be a conventional tachograph based on the prior art. Alternatively, a tachograph or instrument cluster with an integrated reception module can be used as controller.

The tachograph 32 has a plurality of operator control elements 34, interface units 35 for driver and/or vehicle fleet cards, a printer 36, and a display 37. Both interfaces are each designed to control any functions of the tachograph 32 and are additionally used to control a plurality of further vehicle functions as described in the preceding exemplary embodiments. In this exemplary embodiment, the tachograph 32 is used as a server.

The input panels 30 of the interfaces 29 each contain a larger number of operator control elements than the tachograph 32, so that tachograph functions can advantageously be called by the interfaces using a reduced number of operating actions on operator control elements.

The printer 36 integrated in the tachograph 32 can be actuated via the interfaces 29, with any data which do not relate to the tachograph also being able to be printed. By way of example, the interfaces can be used to start a self-check on a plurality of appliances installed in the vehicle, with the results being able to be printed by means of the printer 36.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A mobile interface for controlling a plurality of vehicle functions in a motor vehicle using a first controller which is connected to the vehicle, comprising:
   a data processing unit integrated in the mobile interface and configured to apply at least one cryptological method;
   a wireless data interchange apparatus with a second controller connected to the data processing unit configured to communicate with the first controller;
   an input apparatus configured to provide an input to the data processing unit; and
   an energy store configured to provide power to at least the data processing unit,
   wherein the mobile interface is configured to use a plurality of different cryptological methods, wherein the cryptological methods comprise both symmetric and asymmetric methods, and
   wherein a selection of one of the plural cryptological methods used for transmitting a particular data record is dependent on the particular data record.

2. The interface as claimed in claim 1, wherein the mobile interface further comprises an integrated display apparatus coupled to the data processing unit.

3. The interface as claimed in claim 1, wherein the mobile interface further comprises a memory coupled to the data processing unit.

4. The interface as claimed in claim 3, wherein the data processing unit is connected to at least one safety apparatus configured as at least one of a housing protection unit, a smart card controller, a fingerprint detector, and an iris scanner.

5. The interface as claimed in claim 1, wherein the data processing unit is configured to transmit control commands for at least one further apparatus connected to the vehicle using the wireless data interchange apparatus.

6. The interface as claimed in claim 1, wherein the wireless data interchange apparatus is configured for automatic deactivation during a driving mode.

7. The interface as claimed in claim 1, wherein one of the cryptological methods is used exclusively to transmit control commands for operating a vehicle locking system.

8. The interface as claimed in claim 1, wherein the data processing unit is configured to at least one of actuate and activate functions of an onboard computer and to undertake functions of the onboard computer.

9. The interface as claimed in claim 1, wherein the mobile interface is configured as one of a mobile telephone and a PDA.

10. The interface as claimed in claim 1, wherein the data processing is coupled to an interface unit for at least one of reading and writing to at least one of cards and mobile storage media.

11. The interface as claimed in claim 10, wherein the interface unit is configured as a reading unit for reading driver cards.

12. The interface as claimed in claim 1, wherein the interface is configured for keyless identification.

13. A system for the mobile actuation of vehicle functions comprising:
   an interface comprising:
      a data processing unit integrated in the mobile interface and configured to apply at least one cryptological method;
      a wireless data interchange apparatus with a second controller connected to the data processing unit configured to communicate with the first controller;
      an input apparatus configured to provide an input to the data processing unit; and an energy store configured to provide power to at least the data processing unit; and a controller connected to the vehicle configured for data interchange with the interface using a cryptological method configured to output control signals to target appliances based on operation of the interface, wherein the controller is configured to use a plurality of different cryptological methods, wherein the cryptological methods comprise both symmetric and asymmetric methods, and wherein a selection of one of the plural cryptological methods used for transmitting a particular data record is dependent on the particular data record.

14. The system as claimed in claim 13, wherein the controller is configured as at least one of an instrument and a tachograph, wherein the at least one of the instrument and the tachograph are advantageously part of a combination appliance.

15. The system as claimed in claim 13, wherein the system further comprises
a docking station configured as one of an instrument, a tachograph, and the controller.

16. The system as claimed in claim 15, wherein the docking station and the interface are designed for connection to one another by at least one of a cable and a plug connection.

17. The system as claimed in claim 13, wherein the system contains at least two interfaces.

18. A mobile interface for controlling a plurality of vehicle functions in a motor vehicle using a first controller which is connected to the vehicle, comprising:

a data processing unit integrated in the mobile interface and configured to apply at least one cryptological method;

a wireless data interchange apparatus with a second controller connected to the data processing unit configured to communicate with the first controller;

an input apparatus configured to provide an input to the data processing unit; and an energy store configured to provide power to at least the data processing unit, wherein the mobile interface is configured to use a plurality of different cryptological methods, and wherein a selection of one of the plural cryptological methods used for transmitting a particular data record is dependent on the particular data record, wherein the data processing unit is configured to use at least one cryptological method separately to transmit control commands for operating a locking system of the motor vehicle.

* * * * *